United States Patent
Iwai et al.

(10) Patent No.: US 6,801,381 B2
(45) Date of Patent: Oct. 5, 2004

(54) MAGNETIC DISK APPARATUS

(75) Inventors: Hiroshi Iwai, Fujieda (JP); Takeshi Suzuki, Kakegawa (JP); Hiroshi Tsuyuguchi, Tokyo (JP)

(73) Assignees: Victor Company of Japan, Ltd., Yokohama (JP); Teac Corporation, Tokyo (JP)

( * ) Notice: Subject to any disclaimer, the term of this patent is extended or adjusted under 35 U.S.C. 154(b) by 456 days.

(21) Appl. No.: 09/817,156

(22) Filed: Mar. 27, 2001

(65) Prior Publication Data

US 2001/0048569 A1 Dec. 6, 2001

(30) Foreign Application Priority Data

May 30, 2000 (JP) ........................................ 2000-159809

(51) Int. Cl.[7] .............................................. G11D 5/596
(52) U.S. Cl. ...................................... 360/73.03; 360/75
(58) Field of Search ............................. 360/75, 73.03, 360/49, 78.06, 78.04, 73.06, 73.08; 318/560, 254

(56) References Cited

U.S. PATENT DOCUMENTS

| | | | | |
|---|---|---|---|---|
| 4,752,841 A | * | 6/1988 | Syracuse et al. | 360/49 |
| 4,780,866 A | * | 10/1988 | Syracuse | 369/59.14 |
| 5,099,368 A | * | 3/1992 | Okamura | 360/78.04 |
| 5,204,593 A | * | 4/1993 | Ueki | 318/254 |
| RE34,399 E | * | 10/1993 | Gami et al. | 360/73.01 |
| 5,258,695 A | * | 11/1993 | Utenick et al. | 318/138 |
| 5,998,947 A | * | 12/1999 | Shimizu et al. | 318/268 |
| 6,407,877 B1 | * | 6/2002 | Mitani | 360/78.11 |

FOREIGN PATENT DOCUMENTS

JP          8-340688          12/1996

* cited by examiner

Primary Examiner—David Hudspeth
Assistant Examiner—K. Wong
(74) Attorney, Agent, or Firm—Louis Woo

(57) ABSTRACT

A magnetic disk apparatus includes a spindle motor for rotating a magnetic disk. Either a first pulse-train signal or a second pulse-train signal is selectively generated. The first and second pulse-train signals are different from each other in pulse frequency. When the first pulse-train signal is generated, the spindle motor is controlled to rotate at a first rotational speed in response to the first pulse-train signal. When the second pulse-train signal is generated, the spindle motor is controlled to rotate at a second rotational speed in response to the second pulse-train signal. The second rotational speed differs from the first rotational speed.

3 Claims, 8 Drawing Sheets

MAGNETIC DISK APPARATUS

BACKGROUND OF THE INVENTION

1. Field of the Invention

This invention relates to a magnetic disk apparatus, for example, a magnetic-disk drive apparatus.

2. Description of the Related Art

Magnetic recording media include flexible magnetic disks. A typical flexible magnetic disk is used under conditions as follows. While the disk is rotated at a speed of 300 rpm, data are written thereon at a rate of 0.5 Mbps. Similarly, while the disk is rotated at a speed of 300 rpm, data are read therefrom at a rate of 0.5 Mbps.

There is a flexible magnetic disk of a special type. The data rate is equal to 0.417 Mbps in the case where data are read from the special disk while the disk is rotated at a speed of 300 rpm.

A prior-art drive for the typical disk is incapable of reading data from the special disk.

SUMMARY OF THE INVENTION

It is an object of this invention to provide an apparatus which can handle flexible magnetic disks different from each other in data rate.

A first aspect of this invention provides a magnetic disk apparatus comprising a spindle motor for rotating a magnetic disk;

first means for selectively generating either a first pulse-train signal or a second pulse-train signal which differs from the first pulse-train signal in pulse frequency; and second means for, when the first means generates the first pulse-train signal, controlling the spindle motor to rotate at a first rotational speed in response to the first pulse-train signal, and for, when the first means generates the second pulse-train signal, controlling the spindle motor to rotate at a second rotational speed in response to the second pulse-train signal, the second rotational speed differing from the first rotational speed.

A second aspect of this invention is based on the first aspect thereof, and provides a magnetic disk apparatus further comprising third means for reading a signal from the magnetic disk; fourth means for discriminating data from the signal read by the third means; fifth means for determining whether or not the fourth means normally discriminates the data from the signal read by the third means; and sixth means for, in cases where the fifth means determines that the fourth means normally discriminates the data, controlling the first means to unchange one of the first and second pulse-train signals which is currently generated by the first means, and for, in cases where the fifth means determines that the fourth means does not normally discriminate the data, controlling the first means to change one of the first and second pulse-train signals which is currently generated by the first means to the other of the first and second pulse-train signals.

A third aspect of this invention is based on the first aspect thereof, and provides a magnetic disk apparatus wherein the first means comprises means for generating a fixed-level signal in response to a motor stop signal, and the second means comprises means for, when the first means generates the fixed-level signal, stopping the spindle motor in response to the fixed-level signal.

A fourth aspect of this invention provides a magnetic disk apparatus comprising a spindle motor for rotating a magnetic disk; first means associated with the spindle motor for generating a first signal having a period which decreases as a rotational speed of the motor increases; second means for generating a second signal having a train of pulses, wherein a pulse frequency of the second signal is initially equal to a first frequency; third means for counting pulses in the second signal during every time interval corresponding to the period of the first signal, and generating a third signal depending on a total number of the counted pulses for every time interval corresponding to the period of the first signal; fourth means for generating a fourth signal representing a deviation of the third signal generated by the third means from a fifth signal being a reference signal; fifth means for controlling the rotational speed of the spindle motor in response to the fourth signal generated by the fourth means to nullify the deviation of the third signal from the reference signal; sixth means for reading a sixth signal from the magnetic disk; seventh means for detecting actual data in the sixth signal read by the sixth means; eighth means for determining whether or not the seventh means successfully detects the actual data; ninth means for, when the eighth means determines that the seventh means successfully detects the actual data, maintaining the pulse frequency of the second signal at the first frequency; and tenth means for, when the eighth means determines that the seventh means does not successfully detect the actual data, changing the pulse frequency of the second signal from the first frequency to a second frequency different from the first frequency to change the rotational speed of the spindle motor which is controlled by the fifth means.

DETAILED DESCRIPTION OF THE INVENTION

A prior-art magnetic disk apparatus will be explained below for a better understanding of this invention.

Figure 1:
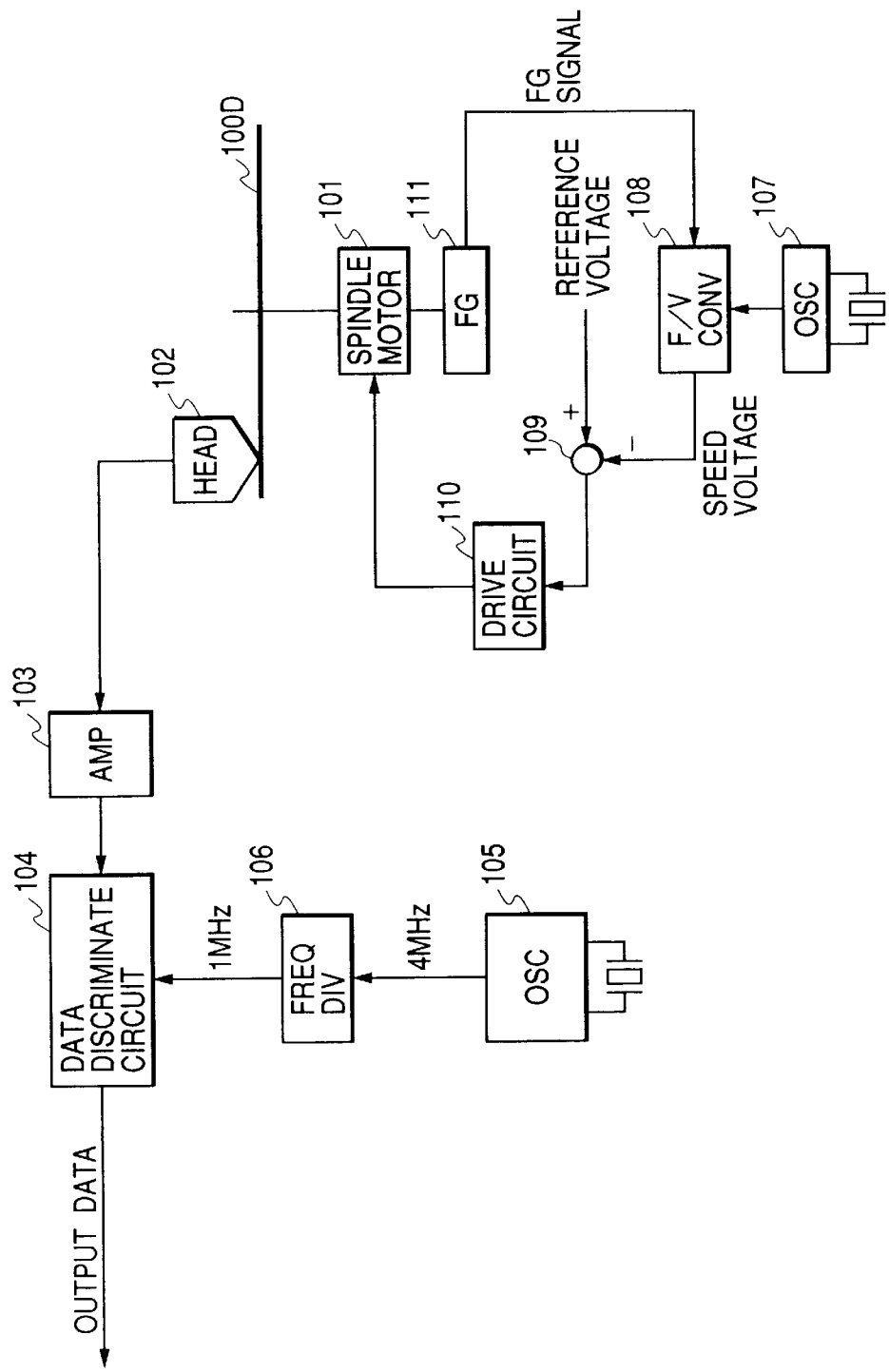
FIG. 1 is a block diagram of a prior-art magnetic disk apparatus.

FIG. 1 shows a prior-art magnetic disk apparatus which includes a spindle motor 101 and a magnetic head 102. The spindle motor 101 has a rotary shaft. A flexible magnetic disk 100D can be coupled with and uncoupled from the shaft of the spindle motor 101. The spindle motor 101 rotates the magnetic disk 100D.

The magnetic disk 100D stores data which have been recorded thereon under conditions where a data rate is equal to 0.5 Mbps and a rotational disk speed is equal to 300 rpm. The magnetic head 102 reads the data from the magnetic disk 100D while the magnetic disk 100D is rotated by the spindle motor 101.

The magnetic head 102 outputs a signal representative of the read data to an amplifier circuit 103. The amplifier circuit 103 amplifies the output signal of the magnetic head 102. The amplifier circuit 103 feeds the amplification-resultant signal to a data discrimination circuit 104. The data discrimination circuit 104 detects actual data, which relate to a data rate of 0.5 Mbps, in the output signal of the amplifier circuit 103. The data discrimination circuit 104 outputs the detected data to an external device (not shown).

In the prior-art apparatus of FIG. 1, a quartz-resonator-added oscillation circuit 105 generates a signal having a frequency of 4 MHz. The oscillation circuit 105 outputs the 4-MHz signal to a frequency divider 106. The device 106 divides the frequency of the 4-MHz signal by four, thereby generating a 1-MHz signal. The frequency divider 106 feeds the 1-MHz signal to the data discrimination circuit 104 as a reference timing signal. The data discrimination circuit 104 uses the 1-MHz reference timing signal in the detection of the 0.5-Mbps data.

The prior-art apparatus of FIG. 1 includes a motor control portion. The motor control portion has a quartz-resonator-added oscillation circuit 107, a frequency-to-voltage (F/V) converter 108, a subtracter 109, a drive circuit 110, and a frequency generator (FG) 111. The oscillation circuit 107 generates a reference signal having a frequency of 0.833 MHz. The oscillation circuit 107 outputs the reference signal to the F/V converter 108. The FG 111 is associated with the shaft of the spindle motor 101. The FG 111 generates an FG signal having a frequency proportional to the rotational speed of the shaft of the spindle motor 101. The FG 111 outputs the FG signal to the F/V converter 108. The F/V converter 108 includes a counter which counts pulses in the reference signal during every time interval determined by the period of the FG signal. The F/V converter 108 also includes a generator which produces a voltage depending on the pulse count number provided by the counter at the end of every time interval determined by the period of the FG signal. The counter and the voltage generator in the F/V converter 108 cooperate to convert the frequency of the FG signal into the corresponding voltage which represents the rotational speed of the shaft of the spindle motor 101. The F/V converter 108 outputs the motor-speed-representing voltage to the subtracter 109. A predetermined reference voltage corresponding to a reference motor speed (300 rpm) is applied to the subtracter 109. The device 109 subtracts the motor-speed-representing voltage from the reference voltage, thereby generating the subtraction-resultant voltage. The subtraction-resultant voltage is equal to the difference between the motor-speed-representing voltage and the reference voltage. The subtraction-resultant voltage represents the deviation of the actual motor speed from the reference motor speed. The subtracter 109 applies the subtraction-resultant voltage to the drive circuit 110. The drive circuit 110 controls the spindle motor 101 in response to the subtraction-resultant signal so as to nullify the deviation of the actual motor speed from the reference motor speed, that is, to equalize the rotational speed of the shaft of the spindle motor 101 to the reference motor speed (300 rpm). As a result, the shaft of the spindle motor 101 is rotated at a constant speed of 300 rpm.

There is a flexible magnetic disk of a special type. The data rate is equal to 0.417 Mbps in the case where data are read from the special disk while the disk is rotated at a speed of 300 rpm.

The data discrimination circuit 104 in the prior-art apparatus of FIG. 1 is tuned to a data rate of 0.5 Mbps. Thus, the data discrimination circuit 104 rejects 0.417-Mbps data.

Accordingly, the prior-art apparatus of FIG. 1 is incapable of reading data from the special disk. Here, "reading" means the accurate transmission of data from the special disk to the output terminal of the data discrimination circuit 104.

First Embodiment

Figure 2:
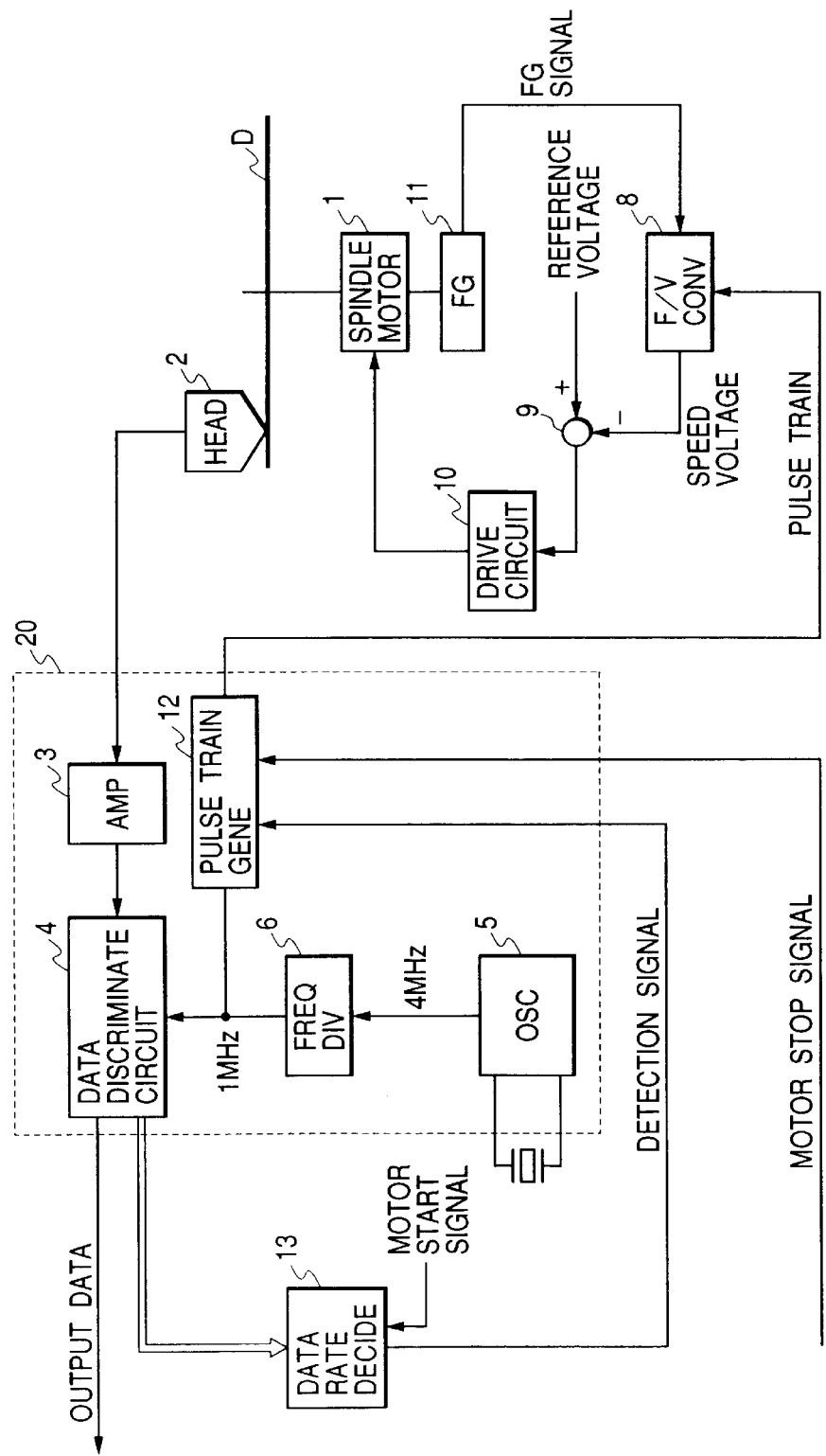
FIG. 2 is a block diagram of a magnetic disk apparatus according to a first embodiment of this invention.

FIG. 2 shows a magnetic disk apparatus according to a first embodiment of this invention. The apparatus of FIG. 2 includes a spindle motor 1 and a magnetic head 2. The spindle motor 1 has a rotary shaft. A flexible magnetic disk D can be coupled with and uncoupled from the shaft of the spindle motor 1. The spindle motor 1 rotates the magnetic disk D. The magnetic disk D stores data which have been recorded thereon under either conditions where a data rate is equal to 0.5 Mbps and a rotational disk speed is equal to 300 rpm or conditions where a data rate is equal to 0.417 Mbps and a rotational disk speed is equal to 300 rpm. The magnetic head 2 reads the data from the magnetic disk D while the magnetic disk D is rotated by the spindle motor 1.

The magnetic head 2 outputs a signal representative of the read data to an amplifier circuit 3. The amplifier circuit 3 amplifies the output signal of the magnetic head 2. The amplifier circuit 3 feeds the amplification-resultant signal to a data discrimination circuit 4. The data discrimination circuit 4 detects actual data, which relate to a data rate of 0.5 Mbps, in the output signal of the amplifier circuit 3. The data discrimination circuit 4 outputs the detected data to an external device (not shown).

The data discrimination circuit 4 is tuned to a data rate of 0.5 Mbps. Thus, the output data from the data discrimination circuit 4 are normal when 0.5-Mbps data are inputted thereinto. On the other hand, the data discrimination circuit 4 rejects 0.417-Mbps data. Accordingly, the output data from the data discrimination circuit 4 are random when 0.417-Mbps data are inputted thereinto.

Figure 3:
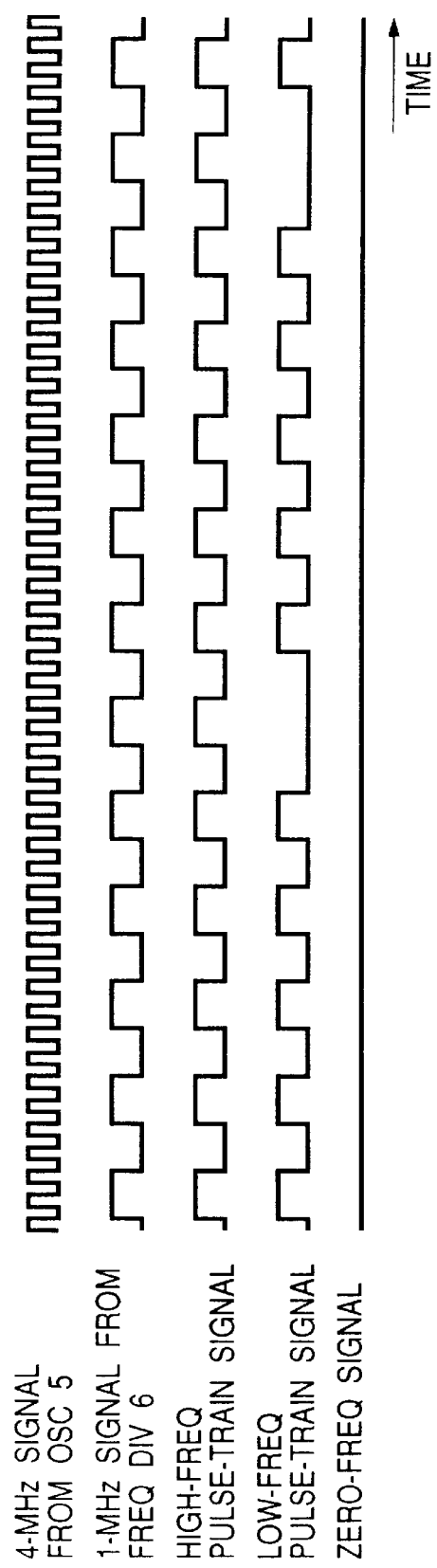
FIG. 3 is a time-domain diagram of signals in the apparatus of FIG. 2.

In the apparatus of FIG. 2, a quartz-resonator-added oscillation circuit 5 generates a signal having a frequency of 4 MHz. As shown in FIG. 3, the 4-MHz signal has a rectangular waveform. The oscillation circuit 5 outputs the 4-MHz signal to a frequency divider 6. The device 6 divides the frequency of the 4-MHz signal by four, thereby generating a 1-MHz signal of a rectangular waveform as shown in FIG. 3. The frequency divider 6 feeds the 1-MHz signal to the data discrimination circuit 4 as a reference timing signal. The data discrimination circuit 4 uses the 1-MHz reference timing signal in the detection of the 0.5-Mbps data.

The frequency divider 6 feeds the 1-MHz signal also to a pulse-train generation circuit 12. Initially, a data-rate deciding portion 13 outputs a "0" signal to the pulse-train generation circuit 12 as a binary detection signal. Then, the data-rate deciding portion 13 responds to conditions of signals fed from the data discrimination circuit 4. Specifically, the data-rate deciding portion 13 monitors the signals fed from the data discrimination circuit 4. In more detail, the data-rate deciding portion 13 determines whether or not a PLL (phase locked loop) circuit in the data discrimination circuit 4 is in its locked state on the basis of the signals fed from the data discrimination circuit 4. When the PLL circuit in the data discrimination circuit 4 is in its locked state, the data-rate deciding portion 13 maintains the state of its output signal to the pulse-train generation circuit 12. On the other hand, when the PLL circuit in the data discrimination circuit 4 is out of its locked state, the data-rate deciding portion 13 changes the state of its output signal to the pulse-train generation circuit 12. Thus, in the case where the data-rate deciding portion 13 determines that the PLL circuit in the data discrimination circuit 4 is in its locked state after the initial stage, the data-rate deciding portion 13 continues to output the "0" signal to the pulse-train generation circuit 12. On the other hand, in the case where the data-rate deciding portion 13 determines that the PLL circuit in the data discrimination circuit 4 is out of its locked state after the initial stage, the data-rate deciding portion 13 replaces the "0" signal with a "1" signal and outputs the "1" signal to the pulse-train generation circuit 12. In the case where the data-rate deciding portion 13 determines that the PLL circuit in the data discrimination circuit 4 is in its locked state after the "0" signal is replaced by the "1" signal, the data-rate deciding portion 13 continues to output the "1" signal to the pulse-train generation circuit 12. On the other hand, in the case where the data-rate deciding portion 13 determines that the PLL circuit in the data discrimination circuit 4 is out of its locked state after the "0" signal is replaced by the "1" signal, the data-rate deciding portion 13 replaces the "1" signal with a "0" signal and outputs the "0" signal to the pulse-train generation circuit 12. The output signal from the data-rate deciding portion 13 to the pulse-train generation circuit 12 is also referred to as the detection signal.

The pulse-train generation circuit 12 produces a pulse-train signal in response to the 1-MHz signal, the output signal from the data-rate deciding portion 13, and a motor stop signal. The motor stop signal is generated by a suitable device (not shown). The pulse-train generation circuit 12 outputs the produced pulse-train signal to a frequency-to-voltage (F/V) converter 8. As will be mentioned later, the output signal from the pulse-train generation circuit 12 can be continuously fixed to a prescribed level ("0" or "1").

When the output signal from the data-rate deciding portion 13 is "0" and also the motor stop signal is "0", the pulse-train generation circuit 12 processes the 1-MHz signal to a low-frequency pulse-train signal (a pulse-decimated signal) and outputs the low-frequency pulse-train signal to the F/V converter 8. Specifically, in this case, the pulse-train generation circuit 12 produces the low-frequency pulse-train signal by removing every sixth pulse from the 1-MHz signal as shown in FIG. 3. When the output signal from the data-rate deciding portion 13 is "1" and the motor stop signal is "0", the pulse-train generation circuit 12 passes the 1-MHz signal to the F/V converter 8 as a high-frequency pulse-train signal. As shown in FIG. 3, the high-frequency pulse-train signal is equal in waveform to the 1-MHz signal. The high-frequency pulse-train signal has a pulse frequency higher than that of the low-frequency pulse-train signal. When the motor stop signal is "1", the pulse-train generation circuit 12 outputs a fixed-level signal or a zero-frequency signal to the F/V converter 8 regardless of the state of the output signal from the data-rate deciding portion 13. As shown in FIG. 3, the zero-frequency signal is fixed at a constant level, and is devoid of pulses.

The apparatus of FIG. 2 includes a motor control portion. The F/V converter 8 is contained in the motor control portion. The motor control portion further has a subtracter 9, a drive circuit 10, and a frequency generator (FG) 11. The FG 11 is associated with the shaft of the spindle motor 1. The FG 11 generates an FG signal having a frequency proportional to the rotational speed of the shaft of the spindle motor 1. The FG 11 outputs the FG signal to the F/V converter 8. The F/V converter 8 includes a counter which counts pulses in the output signal from the pulse-train generation circuit 12 during every time interval determined by the period of the FG signal outputted from the FG 11. The F/V converter 8 also includes a generator which produces a voltage depending on the pulse count number provided by the counter at the end of every time interval determined by the period of the FG signal. The pulse count number increases as the period of the FG signal increases, that is, as the rotational speed of the shaft of the spindle motor 1 drops. On the other hand, the pulse count number decreases as the frequency of the output signal from the pulse-train generation circuit 12 drops. The counter and the voltage generator in the F/V converter 8 cooperate to convert the frequency of the FG signal into the corresponding voltage which depends on not only the rotational speed of the shaft of the spindle motor 1 but also the frequency of the output signal from the pulse-train generation circuit 12. The F/V converter 8 outputs the produced voltage (the motor-speed-representing voltage) to the subtracter 9. A voltage generator (not shown) applies a predetermined reference voltage to the subtracter 9. The device 9 subtracts the motor-speed-representing voltage from the reference voltage, thereby generating the subtraction-resultant voltage. The subtraction-resultant voltage is equal to the difference between the motor-speed-representing voltage and the reference voltage. The subtraction-resultant voltage represents the deviation of the actual motor speed from an effective reference motor speed (an apparent reference motor speed). Basically, the effective reference motor speed is provided by the reference voltage. Since the motor-speed-representing voltage depends on the frequency of the output signal from the pulse-train generation circuit 12, the effective reference motor speed varies in accordance with the frequency of the output signal from the pulse-train generation circuit 12. The subtracter 9 applies the subtraction-resultant voltage to the drive circuit 10. The drive circuit 10 controls the spindle motor 1 in response to the subtraction-resultant signal so as to nullify the deviation of the actual motor speed from the effective reference motor speed, that is, to equalize the rotational speed of the shaft of the spindle motor 1 to the effective reference motor speed. As a result, the shaft of the spindle motor 101 is rotated at a constant speed equal to the effective reference motor speed.

The pulse count number provided by the counter in the F/V converter 8 at the end of every time interval determined by the period of the FG signal decreases as the frequency of the output signal from the pulse-train generation circuit 12 drops. Therefore, the effective reference motor speed varies in accordance with the frequency of the output signal from the pulse-train generation circuit 12. Specifically, the effective reference motor speed is equal to 360 rpm when the high-frequency pulse-train signal is outputted from the pulse-train generation circuit 12. The effective reference motor speed is equal to 300 rpm when the low-frequency pulse-train signal is outputted from the pulse-train generation circuit 12. The effective reference motor speed is equal to 0 rpm when the zero-frequency signal is outputted from the pulse-train generation circuit 12. As a result, the shaft of the spindle motor 1 is rotated at a constant speed of 360 rpm when the high-frequency pulse-train signal is outputted from the pulse-train generation circuit 12. The shaft of the spindle motor 1 is rotated at a constant speed of 300 rpm when the low-frequency pulse-train signal is outputted from the pulse-train generation circuit 12. The shaft of the spindle motor 1 is held stationary when the zero-frequency signal is outputted from the pulse-train generation circuit 12.

A description will be given of a general case where a low-frequency pulse-train signal is generated by removing "n" pulses per "m" pulses in a high-frequency pulse-train signal. In this case, the rotational speed $v2$ of the shaft of the spindle motor 1 which occurs in response to the low-frequency pulse-train signal is expressed by the following equation.

$$v2 = v1 \cdot (m-n)/m \quad (1)$$

where v1 denotes the rotational speed of the shaft of the spindle motor 1 which occurs in response to the high-frequency pulse-train signal. In the present embodiment of this invention, v1, v2, m and "n" are equal to 360 rpm, 300 rpm, 6, and 1, respectively.

The equation (1) indicates that the zero-frequency signal corresponds to equality of "n" with "m", and that the rotational speed of the shaft of the spindle motor 1 which occurs in response to the zero-frequency signal is equal to 0 rpm.

The apparatus of FIG. 2 operates as follows. It is assumed that a magnetic disk D stores data which have been recorded thereon under conditions where a data rate is equal to 0.5 Mbps and a rotational disk speed is equal to 300 rpm. The magnetic disk D is placed in the apparatus, and then the apparatus is started. Initially, the data-rate deciding portion 13 outputs the "0" signal to the pulse-train generation circuit 12. It is assumed that the motor stop signal is "0". Since the output signal from the data-rate deciding portion 13 is "0" and also the motor stop signal is "0", the pulse-train generation circuit 12 processes the 1-MHz signal to the low-frequency pulse-train signal (the pulse-decimated signal) and outputs the low-frequency pulse-train signal to the F/V converter 8. Therefore, the shaft of the spindle motor 1 and the magnetic disk D start to be rotated at a constant speed of 300 rpm. The magnetic head 2 reads the data from the magnetic disk D while the magnetic disk D is rotated at a constant speed of 300 rpm. The read data are transmitted from the magnetic head 2 to the data discrimination circuit 4 via the amplifier circuit 3. Since the data on the magnetic disk D match with a data rate of 0.5 Mbps and a disk rotational speed of 300 rpm, the data discrimination circuit 4 successfully detects actual data, which relate to a data rate of 0.5 Mbps, in the read data fed via the amplifier circuit 3. At this time, the PLL circuit in the data discrimination circuit 4 is in its locked state. The data discrimination circuit 4 outputs the detected data to the external device (not shown). Since the PLL circuit in the data discrimination circuit 4 is in its locked state, the data-rate deciding portion 13 maintains the "0" state of its output signal to the pulse-train generation circuit 12. As a result, the pulse-train generation circuit 12 continues to output the low-frequency pulse-train signal to the F/V converter 8, and the shaft of the spindle motor 1 and the magnetic disk D remain rotated at 300 rpm. In addition, the magnetic head 2 continues to read the data from the magnetic disk D, and the data discrimination circuit 4 remains successfully detecting actual data in the read data fed via the amplifier circuit 3.

Figure 4:
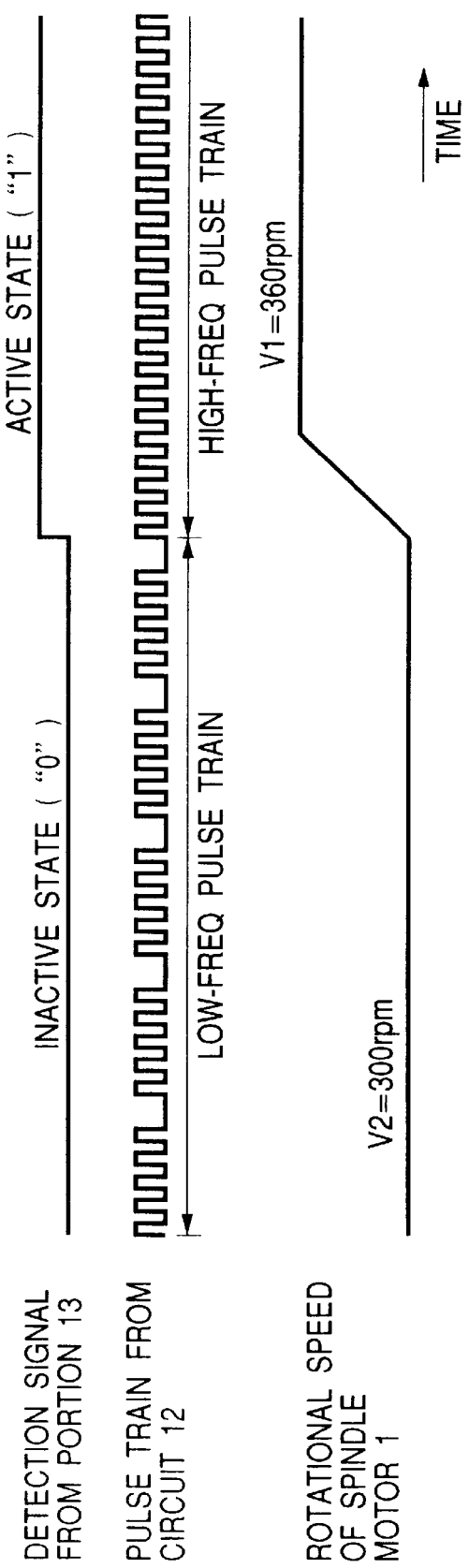
FIG. 4 is a time-domain diagram of signals in the apparatus of FIG. 2.

It is assumed that a magnetic disk D stores data which have been recorded thereon under conditions where a data rate is equal to 0.417 Mbps and a rotational disk speed is equal to 300 rpm. The magnetic disk D is placed in the apparatus, and then the apparatus is started. Initially, the data-rate deciding portion 13 outputs the "0" signal to the pulse-train generation circuit 12 as shown in FIG. 4. It is assumed that the motor stop signal is "0". Since the output signal from the data-rate deciding portion 13 is "0" and also the motor stop signal is "0", the pulse-train generation circuit 12 processes the 1-MHz signal to the low-frequency pulse-train signal (the pulse-decimated signal) and outputs the low-frequency pulse-train signal to the F/V converter 8 as shown in FIG. 4. Therefore, the shaft of the spindle motor 1 and the magnetic disk D start to be rotated at a constant speed of 300 rpm as shown in FIG. 4. The magnetic head 2 reads the data from the magnetic disk D while the magnetic disk D is rotated at a constant speed of 300 rpm. The read data are transmitted from the magnetic head 2 to the data discrimination circuit 4 via the amplifier circuit 3. Since the data on the magnetic disk D are inconsistent with a data rate of 0.5 Mbps, the data discrimination circuit 4 fails to detect actual 0.417-Mbps data in the read data fed via the amplifier circuit 3. At this time, the PLL circuit in the data discrimination circuit 4 is out of its locked state. Thus, the data-rate deciding portion 13 changes its output signal from "0" to "1" and outputs the "1" signal to the pulse-train generation circuit 12 as shown in FIG. 4. Consequently, the pulse-train generation circuit 12 outputs the high-frequency pulse-train signal (the 1-MHz signal) to the F/V converter 8 instead of the low-frequency pulse-train signal as shown in FIG. 4. Therefore, the rotational speed of the shaft of the spindle motor 1 and the magnetic disk D changes from 300 rpm to 360 rpm as shown in FIG. 4. The magnetic head 2 reads the data from the magnetic disk D while the magnetic disk D is rotated at a constant speed of 360 rpm. The read data are transmitted from the magnetic head 2 to the data discrimination circuit 4 via the amplifier circuit 3. Since the data corresponding to a data rate of 0.417 Mbps and a rotational disk speed of 300 rpm are read from the magnetic disk D while the magnetic disk D is rotated at a speed of 360 rpm, the read data fed to the data discrimination circuit 4 via the amplifier circuit 3 are equivalent to 0.5-Mbps data (0.5 is approximately equal to 0.417 multiplied by 360/300). Therefore, the data discrimination circuit 4 successfully detects actual 0.417-Mbps data in the read data fed via the amplifier circuit 3. At this time, the PLL circuit in the data discrimination circuit 4 is in its locked state. The data discrimination circuit 4 outputs the detected data to the external device (not shown). Since the PLL circuit in the data discrimination circuit 4 is in its locked state, the data-rate deciding portion 13 maintains the "1" state of its output signal to the pulse-train generation circuit 12. As a result, the pulse-train generation circuit 12 continues to output the high-frequency pulse-train signal to the F/V converter 8, and the shaft of the spindle motor 1 and the magnetic disk D remain rotated at 360 rpm. In addition, the magnetic head 2 continues to read the data from the magnetic disk D, and the data discrimination circuit 4 remains successfully detecting actual data in the read data fed via the amplifier circuit 3.

When the motor stop signal changes from "0" to "1", the pulse-train generation circuit 12 outputs the zero-frequency signal to the F/V converter 8 regardless of the state of the output signal from the data-rate deciding portion 13. As a result, the shaft of the spindle motor 1 and the magnetic disk D are stopped. The stop of the spindle motor 1 and the magnetic disk D provides power saving and noise reduction.

Figure 5:
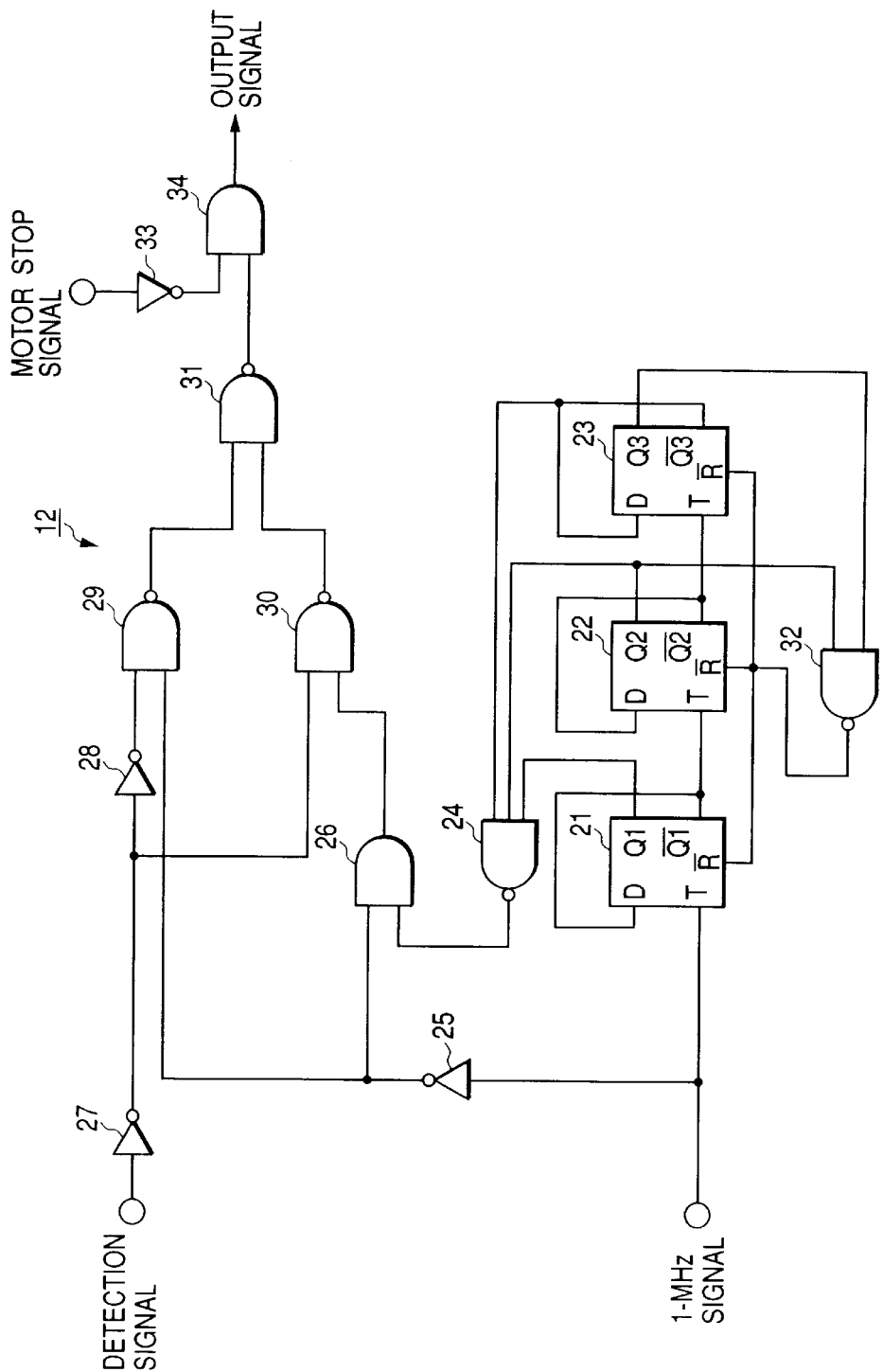
FIG. 5 is a block diagram of a pulse-train generation circuit in FIG. 2.

FIG. 5 shows the details of the pulse-train generation circuit 12. As shown in FIG. 5, the pulse-train generation circuit 12 includes flip-flops 21, 22, 23, a NAND gate 24, an inverter 25, an AND gate 26, inverters 27 and 28, NAND gates 29, 30, 31, and 32, an inverter 33, and an AND gate 34.

The 1-MHz signal is applied to the T input terminal of the flip-flop 21 and the input terminal of the inverter 25 from the frequency divider 6 (see FIG. 2). The non-inverting output terminal Q1 of the flip-flop 21 is connected to a first input terminal of the NAND gate 24. The inverting output terminal $\overline{Q1}$ of the flip-flop 21 is connected to the D input terminal thereof and the T input terminal of the flip-flop 22. The non-inverting output terminal Q2 of the flip-flop 22 is connected to a second input terminal of the NAND gate 24 and a first input terminal of the NAND gate 32. The inverting output terminal $\overline{Q2}$ of the flip-flop 22 is connected to the D input terminal thereof and the T input terminal of the flip-flop 23. The non-inverting output terminal Q3 of the flip-flop 23 is connected to a second input terminal of the NAND gate 32. The inverting output terminal $\overline{Q3}$ of the flip-flop 23 is connected to the D input terminal thereof and a third input terminal of the NAND gate 24. The output terminal of the NAND gate 32 is connected to the reset terminals $\overline{R}$ of the flip-flops 21, 22, and 23. The output terminal of the NAND gate 24 is connected to a first input terminal of the AND gate 26.

In the pulse-train generation circuit 12 of FIG. 5, the output terminal of the inverter 25 is connected to a second input terminal of the AND gate 26 and a first input terminal of the NAND gate 29. The output terminal of the AND gate 26 is connected to a first input terminal of the NAND gate 30. The detection signal is applied to the input terminal of the inverter 27 from the data-rate deciding portion 13. The output terminal of the inverter 27 is connected to the input terminal of the inverter 28 and a second input terminal of the NAND gate 30. The output terminal of the inverter 28 is connected to a second input terminal of the NAND gate 29. The output terminal of the NAND gate 29 is connected to a first input terminal of the NAND gate 31. The output terminal of the NAND gate 30 is connected to a second input terminal of the NAND gate 31. The output terminal of the NAND gate 31 is connected to a first input terminal of the AND gate 34. The motor stop signal is applied to the input terminal of the inverter 33. The output terminal of the inverter 33 is connected to a second input terminal of the AND gate 34. The output terminal of the AND gate 34 is connected to the F/V converter 8 (see FIG. 2). One of the high-frequency pulse-train signal, the low-frequency pulse-train signal, and the zero-frequency signal appears at the output terminal of the AND gate 34.

Figure 6:
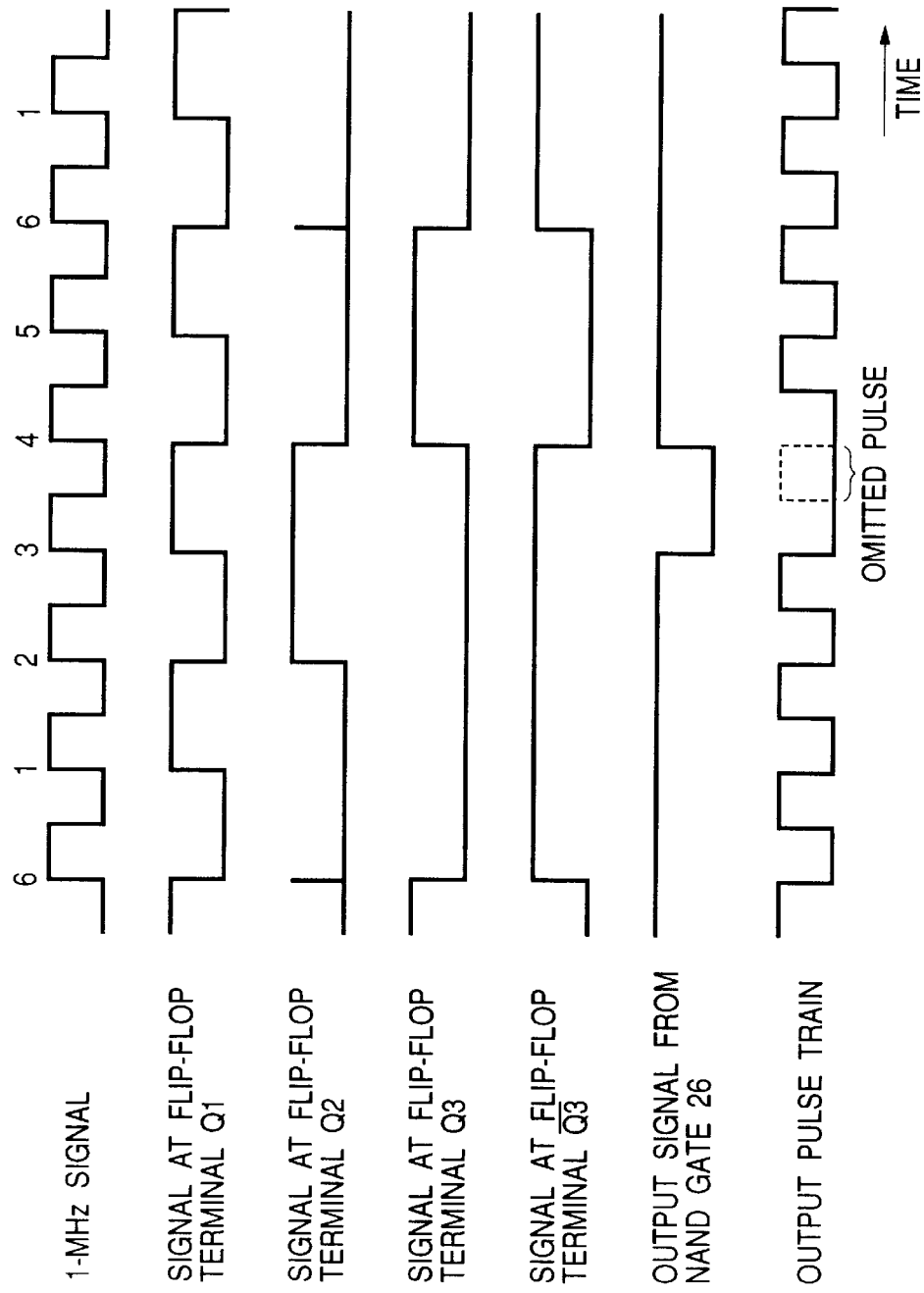
FIG. 6 is a time-domain diagram of signals in the circuit of FIG. 5.

The pulse-train generation circuit 12 of FIG. 5 operates as follows. The flip-flop 21 halves the frequency of the 1-MHz signal, thereby generating 0.5-MHz signals at its output terminals Q1 and $\overline{Q1}$. The 0.5-MHz signal which appears at the output terminal Q1 has a rectangular waveform as shown in FIG. 6. The flip-flop 22 generates pulse signals at its output terminals Q2 and $\overline{Q2}$ in response to the 0.5-MHz signal which appears at the output terminal $\overline{Q1}$ of the flip-flop 21. The pulse signal which appears at the output terminal Q2 has a waveform as shown in FIG. 6. The flip-flop 23 generates pulse signals at its output, terminals Q3 and $\overline{Q3}$ in response to the pulse signal which appears at the output terminal $\overline{Q2}$ of the flip-flop 22. The pulse signals which appear at the output terminals Q3 and $\overline{Q3}$ have waveforms as shown in FIG. 6. The NAND gate 32 executes NAND operation between the pulse signal which appears at the output terminal Q2 of the flip-flop 22 and the pulse signal which appears at the output terminal Q3 of the flip-flop 23. The NAND gate 32 generates a signal representative of the result of NAND operation, and outputs the generated signal to the reset terminals $\overline{R}$ of the flip-flops 21, 22, and 23. The flip-flops 21, 22, and 23 are reset in response to the output signal of the NAND gate 32.

In the pulse-train generation circuit 12 of FIG. 5, the NAND gate 24 executes NAND operation among the 0.5-MHz signal which appears at the output terminal Q1 of the flip-flop 21, the pulse signal which appears at the output terminal Q2 of the flip-flop 22, and the pulse signal which appears at the output terminal $\overline{Q3}$ of the flip-flop 23. The NAND gate 24 generates a signal representative of the result of NAND operation, and outputs the generated signal to the AND gate 26. The output signal of the NAND gate 24 has a waveform as shown in FIG. 6. Specifically, the output signal of the NAND gate 24 periodically falls into and remains in a low-level state for a limited time interval corresponding to every sixth pulse in the inversion of the 1-MHz signal. The inverter 25 outputs the inversion of the 1-MHz signal to the AND gate 26 and the NAND gate 29. The AND gate 26 is periodically closed by the output signal of the NAND gate 24, thereby removing every sixth pulse from the inversion of the 1 MHz signal. The AND gate 26 outputs the resultant signal (the pulse-decimated signal) to the NAND gate 30.

The inverter 27 outputs the inversion of the detection signal to the inverter 28 and the NAND gate 30. The inverter 28 regenerates the detection signal, and outputs the regenerated detection signal to the NAND gate 29. The NAND gates 29 and 30 are selectively closed and opened in response to the detection signal. When the detection signal is "0", the NAND gate 29 is closed and the NAND gate 30 is open. Thus, in this case, the pulse-decimated signal outputted from the AND gate 26 propagates to the NAND gate 31 through the NAND gate 30 while the 1-MHz signal outputted from the inverter 25 is inhibited from reaching the NAND gate 31. The pulse-decimated signal passes through the NAND gate 31 before reaching the AND gate 34. On the other hand, when the detection signal is "1", the NAND gate 29 is open and the NAND gate 30 is closed. Thus, in this case, the 1-MHz signal outputted from the inverter 25 propagates to the NAND gate 31 through the NAND gate 29 while the pulse-decimated signal outputted from the AND gate 26 is inhibited from reaching the NAND gate 31. The 1-MHz signal passes through the NAND gate 31 before reaching the AND gate 34.

In the pulse-train generation circuit 12 of FIG. 5, the inverter 33 outputs the inversion of the motor stop signal to the AND gate 34. The AND gate 34 is selectively closed and opened in response to the motor stop signal. When the motor stop signal is "0", the AND gate 34 is open. Thus, in this case, the pulse-decimated signal or the 1-MHz signal passes through the AND gate 34 before being fed to the F/V converter 8 (see FIG. 2) as the low-frequency pulse-train signal and the high-frequency pulse-train signal respectively. On the other hand, when the motor stop signal is "1", the AND gate 34 is closed. Thus, in this case, the AND gate 34 outputs a "0" signal to the F/V converter 8 (see FIG. 2) as the zero-frequency signal.

In general, decimation of pulses in a high-frequency pulse-train signal to generate a low-frequency pulse-train signal may cause a variation in the rotational speed of the shaft of a spindle motor. Experiments were performed to measure the relation among the rate of decimation of pulses in a high-frequency pulse-train signal to generate a low-frequency pulse-train signal, a variation in the rotational speed of the shaft of a spindle motor, the frequency of an output signal of an FG, and conditions of data read from a magnetic disk and data write thereinto. The results of the experiments revealed that the variation in the rotational speed of the shaft of the spindle motor did not interfere with the data read from the magnetic disk and the data write thereinto in the case where the ratio "fp/fg" of the frequency "fp" of the high-frequency pulse-train signal to the frequency "fg" of the output signal of the FG was equal to or greater than 100 and the pulse decimation rate "n/m" (meaning that n pulses were removed per m pulses) was equal to 0.3 or less.

Preferably, the amplifier circuit 3, the data discrimination circuit 4, the oscillation circuit 5 except the quartz resonator, the frequency divider 6, and the pulse-train generation circuit 12 are formed by a common IC 20 as shown in FIG. 2. This design is advantageous in miniaturizing the apparatus of FIG. 2 and reducing the weight thereof. Preferably, the F/V converter 8, the subtracter 9, the drive circuit 10, and the FG 11 are formed by a common IC.

Figure 8:
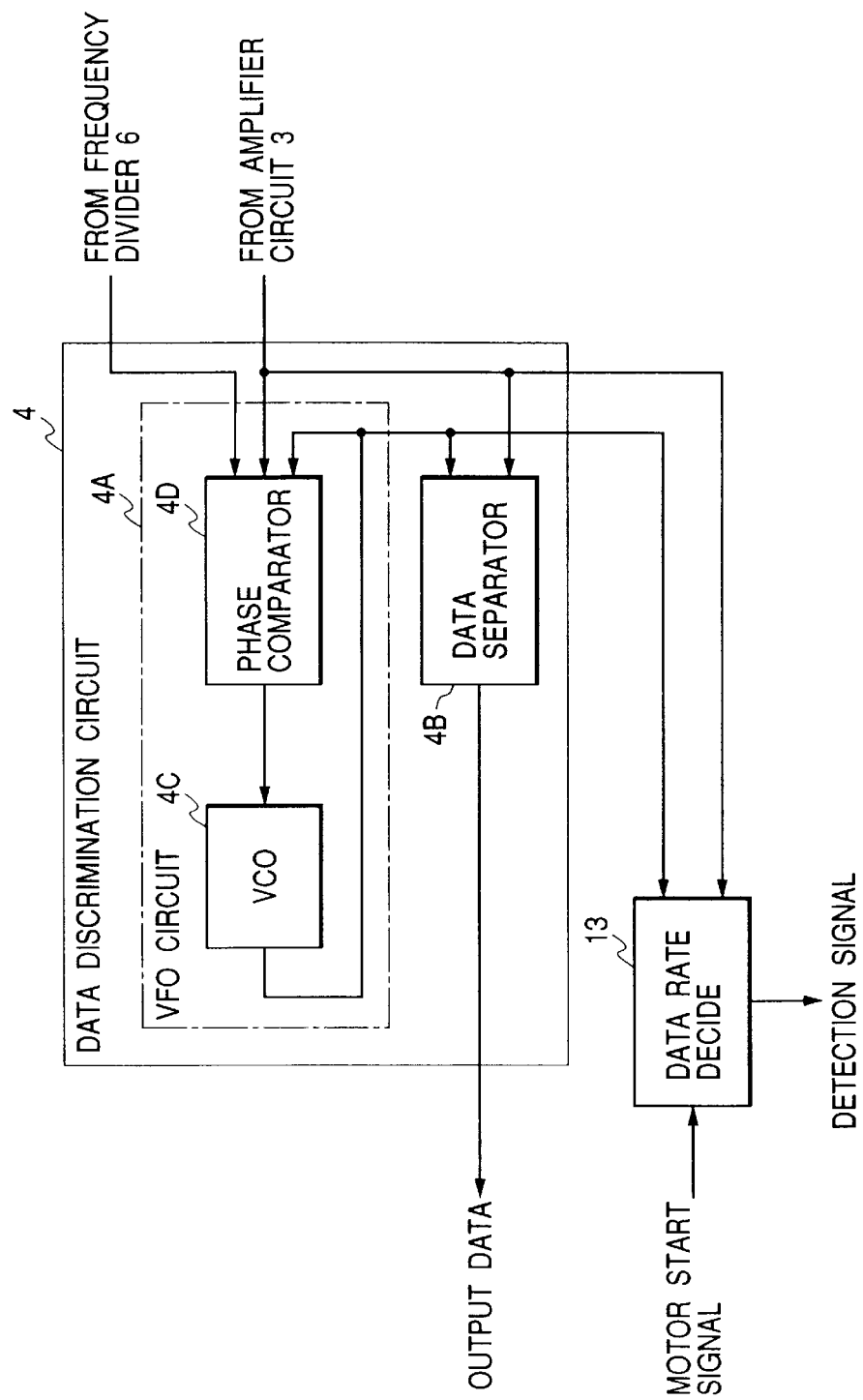
FIG. 8 is a block diagram of a portion of the apparatus in FIG. 2.

As shown in FIGS. 2 and 8, the data-rate deciding portion 13 receives a motor start signal from a suitable device (not shown). The motor start signal is "0" when the spindle motor 1 is in its stand-by state. The motor start signal changes from "0" to "1" when the spindle motor 1 is activated.

As shown in FIG. 8, the data discrimination circuit 4 includes a VFO (variable frequency oscillator) circuit 4A and a data separator 4B. The VFO circuit 4A has a VCO (voltage-controlled oscillator) 4C and a phase comparator 4D. The VCO 4C and the phase comparator 4D are connected and designed to compose a PLL (phase locked loop) circuit. A loop filter (not shown) is provided in, for example, an output stage of the phase comparator 4D.

In general, the magnetic disk D has a recording area divided into sectors (for example, 18 sectors). Each of the sectors is composed of a sync area and a data area. In each sector, the sync area is followed by the data area. In each sector, the sync area stores a sync signal while the data area stores data (information). During operation of the apparatus of FIG. 2, the output signal from the amplifier circuit 3 has the alternation of sync signals and data.

As shown in FIG. 8, the phase comparator 4D receives the 1-MHz reference timing signal from the frequency divider 6. The phase comparator 4D receives the output signal of the amplifier circuit 3. The phase comparator 4D receives an output signal of the VCO 4C. The phase comparator 4D responds to every sync signal in the output signal of the amplifier circuit 3. The device 4D compares the phase of the sync signal and the phase of the VCO output signal. During an initial stage until the output signal of the amplifier circuit 3 becomes effective, the device 4D may compare the phase of the 1-MHz reference timing signal and the phase of the VCO output signal. The phase comparator 4D generates a voltage signal depending on the result of the phase comparison. The phase comparator 4D outputs the generated voltage signal to the VCO 4C. The VCO 4C oscillates in response to the output signal of the phase comparator 4D, generating a data window signal (a data read signal) locked in phase and frequency to the sync signal. The VCO 4C outputs the data window signal to the phase comparator 4D, the data separator 4B, and the data-rate deciding portion 13.

The data separator 4B receives the output signal of the amplifier circuit 3. The device 4B separates data from the output signal of the amplifier circuit 3 in response to the data window signal. The data separator 4B outputs the separated data to the external device (not shown) as the detected data.

The VFO circuit (the PLL circuit) 4A in the data discrimination circuit 4 has a narrow frequency capture range or a narrow frequency lockable range centered at a frequency corresponding to a data rate of 0.5 Mbps. When the frequency of a sync signal in the output signal of the amplifier circuit 3 is in the frequency capture range, the PLL circuit or the data window signal is locked to the sync signal. In this case, the data window signal is stable in frequency and phase. Thus, in this case, the data window signal has a sharp frequency spectrum. When the frequency of a sync signal in the output signal of the amplifier circuit 3 is outside the frequency capture range, the PLL circuit or the data window signal can not be locked to the sync signal. In this case, the data window signal is unstable in frequency and phase. Thus, in this case, the data window signal has a broad frequency spectrum. Specifically, when the output signal of the amplifier circuit 3 corresponds to a data rate of 0.5 Mbps and a rotational disk speed of 300 rpm, the frequency of a sync signal therein is in the frequency capture range so that the PLL circuit or the data window signal is locked to the sync signal. When the output signal of the amplifier circuit 3 corresponds to a data rate of 0.417 Mbps and a rotational disk speed of 300 rpm, the frequency of a sync signal therein is outside the frequency capture range so that the PLL circuit or the data window signal can not be locked to the sync signal.

As shown in FIG. 8, the data-rate deciding portion 13 receives the output signal of the amplifier circuit 3 via the data discrimination circuit 4. The data-rate deciding portion 13 determines whether or not the PLL circuit (the VFO circuit) 4A in the data discrimination circuit 4 is in its locked state on the basis of the data window signal or on the basis of both the data window signal and the output signal of the amplifier circuit 3. As previously mentioned, when the PLL circuit is in its locked state, the data window signal is stable in frequency and phase. On the other hand, when the PLL circuit is out of its locked state, the data window signal is unstable in frequency and phase. The data-rate deciding portion 13 detects the frequency-phase stability of the data window signal, and uses the detected stability in determining whether or not the PLL circuit is in its locked state. Alternatively, the data-rate deciding portion 13 may detect the frequency spectrum of the data window signal, and use the detected frequency spectrum in determining whether or not the PLL circuit is in its locked state. The data-rate deciding portion 13 resets its output signal (the detection signal) to "0" in response to the "0" state of the motor start signal. The data-rate deciding portion 13 maintains the state of its output signal (the detection signal) when determining that the PLL circuit is in its locked state. On the other hand, the data-rate deciding portion 13 changes the state of its output signal (the detection signal) when determining that the PLL circuit is out of its locked state.

For example, the data-rate deciding portion 13 includes a "0" generator, a "1" generator, a switch, a reset circuit, and a lock detector. The "0" generator outputs a "0" signal to the switch. The "1" generator outputs a "1" signal to the switch. The switch selects one of the "0" signal and the "1" signal, and outputs the selected signal as the detection signal (the output signal of the data-rate deciding portion 13). The reset circuit controls the switch in response to the motor start signal so that the switch will initially select the "0" signal. The lock detector senses the frequency-phase stability of the data window signal, and compares the sensed stability with a predetermined criterion. When the sensed stability is higher than the criterion, the lock detector holds the switch unchanged so that the state of the detection signal (the output signal of the data-rate deciding portion 13) is maintained. On the other hand, when the sensed stability is equal to or less than the criterion, the lock detector changes the switch so that the state of the detection signal (the output signal of the data-rate deciding portion 13) is changed.

Alternatively, the lock detector may sense the frequency spectrum of the data window signal. In this case, the lock detector compares the sensed frequency spectrum with a predetermined reference frequency spectrum. The lock detector controls the switch in response to the result of the spectrum comparison.

Second Embodiment

Figure 7:
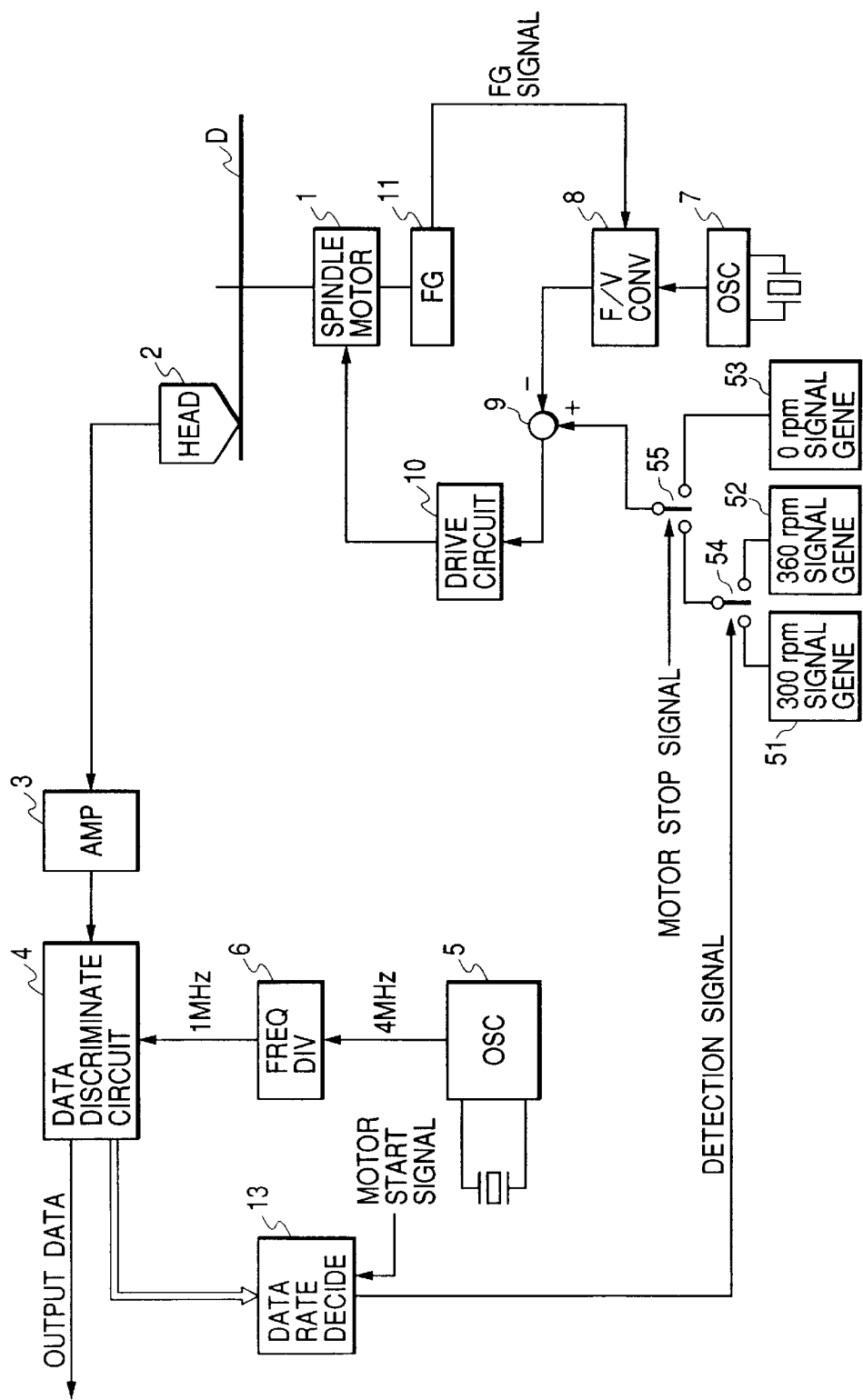
FIG. 7 is a block diagram of a magnetic disk apparatus according to a second embodiment of this invention.

FIG. 7 shows a magnetic disk apparatus according to a second embodiment of this invention. The apparatus of FIG. 7 is similar to the apparatus of FIG. 2 except for design changes mentioned later.

The apparatus of FIG. 7 includes a quartz-resonator-added oscillation circuit 7, signal generators 51, 52, and 53, and switches 54 and 55. The pulse-train generation circuit 12 (see FIG. 2) is omitted from the apparatus of FIG. 7.

The oscillation circuit 7 generates a reference signal having a frequency of 0.833 MHz. The oscillation circuit 7 outputs the reference signal to the F/V converter 8. The F/V converter 8 includes a counter which counts pulses in the reference signal during every time interval determined by the period of the FG signal outputted from the FG 11. The F/V converter 8 also includes a generator which produces a voltage depending on the pulse count number provided by the counter at the end of every time interval determined by the period of the FG signal. The counter and the voltage generator in the F/V converter 8 cooperate to convert the frequency of the FG signal into the corresponding voltage which represents the rotational speed of the shaft of the spindle motor 1. The F/V converter 8 outputs the motor-speed-representing voltage to the subtracter 9.

The signal generator 51 produces a first reference voltage corresponding to a first reference motor speed equal to 300 rpm. The signal generator 51 applies the 300-rpm voltage to the switch 54. The signal generator 52 produces a second reference voltage corresponding to a second reference motor speed equal to 360 rpm. The signal generator 52 applies the 360-rpm voltage to the switch 54. The switch 54 selects one of the 300-rpm voltage and the 360-rpm voltage in response to the detection signal outputted from the data-rate deciding portion 13. The switch 54 passes the selected voltage to the switch 55. Specifically, the switch 54 selects the 300-rpm voltage and passes it to the switch 55 when the detection signal is "0". The switch 54 selects the 360-rpm voltage and passes it to the switch 55 when the detection signal is "1".

The signal generator 53 produces a third reference voltage corresponding to a third reference motor speed equal to 0 rpm. The signal generator 53 applies the 0-rpm voltage to the switch 55. The switch 55 selects one of the 0-rpm voltage and the output voltage from the switch 54 in response to the motor stop signal. The switch 55 passes the selected voltage to the subtracter 9. Specifically, the switch 55 selects the output voltage from the switch 54 and passes it to the subtracter 9 when the motor stop signal is "0". The switch 55 selects the 0-rpm voltage and passes it to the subtracter 9 when the motor stop signal is "1".

Thus, in the case where the detection signal (the output signal from the data-rate deciding portion 13) is "0" while the motor stop signal is "0", the 300-rpm voltage is applied to the subtracter 9 via the switch 55 as a final reference voltage. In the case where the detection signal is "1" while the motor stop signal is "0", the 360-rpm voltage is applied to the subtracter 9 via the switch 55 as a final reference voltage. In the case where the motor stop signal is "1", the 0-rpm voltage is applied to the subtracter 9 via the switch 55 as a final reference voltage regardless of the state of the detection signal.

As previously mentioned, the subtracter 9 receives the motor-speed-representing voltage from the F/V converter 8. The device 9 subtracts the motor-speed-representing voltage from the final reference voltage, thereby generating the subtraction-resultant voltage. The subtraction-resultant voltage is equal to the difference between the motor-speed-representing voltage and the final reference voltage. The subtraction-resultant voltage represents the deviation of the actual motor speed from the reference motor speed given by the final reference voltage. The subtracter 9 applies the subtraction-resultant voltage to the drive circuit 10. The drive circuit 10 controls the spindle motor 1 in response to the subtraction-resultant signal so as to nullify the deviation of the actual motor speed from the reference motor speed, that is, to equalize the rotational speed of the shaft of the spindle motor 1 to the reference motor speed. As a result, the shaft of the spindle motor 1 is rotated at a constant speed equal to the reference motor speed given by the final reference voltage. Thus, the shaft of the spindle motor 1 is rotated at 300 rpm when the final reference voltage is the 300-rpm voltage. The shaft of the spindle motor 1 is rotated at 360 rpm when the final reference voltage is the 360-rpm voltage. The shaft of the spindle motor 1 is stationary when the final reference voltage is the 0-rpm voltage.

The apparatus of FIG. 7 operates as follows. It is assumed that a magnetic disk D stores data which have been recorded thereon under conditions where a data rate is equal to 0.5 Mbps and a rotational disk speed is equal to 300 rpm. The magnetic disk D is placed in the apparatus, and then the apparatus is started. Initially, the data-rate deciding portion 13 outputs the "0" signal to the switch 54. It is assumed that the motor stop signal is "0". Since the output signal from the data-rate deciding portion 13 is "0" and also the motor stop signal is "0", the 300-rpm voltage produced by the signal generator 51 is applied to the subtracter 9 via the switches 54 and 55. Therefore, the shaft of the spindle motor 1 and the magnetic disk D start to be rotated at a constant speed of 300 rpm. The magnetic head 2 reads the data from the magnetic disk D while the magnetic disk D is rotated at a constant speed of 300 rpm. The read data are transmitted from the magnetic head 2 to the data discrimination circuit 4 via the amplifier circuit 3. Since the data on the magnetic disk D match with a data rate of 0.5 Mbps and a disk rotational speed of 300 rpm, the data discrimination circuit 4 successfully detects actual data, which relate to a data rate of 0.5 Mbps, in the read data fed via the amplifier circuit 3. At this time, the PLL circuit in the data discrimination circuit 4 is in its locked state. The data discrimination circuit 4 outputs the detected data to the external device (not shown). Since the PLL circuit in the data discrimination circuit 4 is in its locked state, the data-rate deciding portion 13 maintains the "0" state of its output signal to the switch 54. As a result, the 300-rpm voltage continues to be applied to the subtracter 9, and the shaft of the spindle motor 1 and the magnetic disk D remain rotated at 300 rpm. In addition, the magnetic head 2 continues to read the data from the magnetic disk D, and the data discrimination circuit 4 remains successfully detecting actual data in the read data fed via the amplifier circuit 3.

It is assumed that a magnetic disk D stores data which have been recorded thereon under conditions where a data rate is equal to 0.417 Mbps and a rotational disk speed is equal to 300 rpm. The magnetic disk D is placed in the apparatus, and then the apparatus is started. Initially, the data-rate deciding portion 13 outputs the "0" signal to the switch 54. It is assumed that the motor stop signal is "0". Since the output signal from the data-rate deciding portion 13 is "0" and also the motor stop signal is "0", the 300-rpm voltage produced by the signal generator 51 is applied to the subtracter 9 via the switches 54 and 55. Therefore, the shaft of the spindle motor 1 and the magnetic disk D start to be rotated at a constant speed of 300 rpm. The magnetic head 2 reads the data from the magnetic disk D while the magnetic disk D is rotated at a constant speed of 300 rpm. The read data are transmitted from the magnetic head 2 to the data discrimination circuit 4 via the amplifier circuit 3. Since the data on the magnetic disk D are inconsistent with a data rate of 0.5 Mbps, the data discrimination circuit 4 fails to detect actual 0.417-Mbps data in the read data fed via the amplifier circuit 3. At this time, the PLL circuit in the data discrimination circuit 4 is out of its locked state. Thus, the data-rate deciding portion 13 changes its output signal from "0" to "1" and outputs the "1" signal to the switch 54 Consequently, the 360-rpm voltage produced by the signal generator 52 is applied to the subtracter 9 via the switches 54 and 55 instead of the 300-rpm voltage. Therefore, the rotational speed of the shaft of the spindle motor 1 and the magnetic disk D changes from 300 rpm to 360 rpm. The magnetic head 2 reads the data from the magnetic disk D while the magnetic disk D is rotated at a constant speed of 360 rpm. The read data are transmitted from the magnetic head 2 to the data discrimination circuit 4 via the amplifier circuit 3. Since the data corresponding to a data rate of 0.417 Mbps and a rotational disk speed of 300 rpm are read from the magnetic disk D while the magnetic disk D is rotated at a speed of 360 rpm, the read data fed to the data discrimination circuit 4 via the amplifier circuit 3 are equivalent to 0.5-Mbps data (0.5 is approximately equal to 0.417 multiplied by 360/300). Therefore, the data discrimination circuit 4 successfully detects actual 0.417-Mbps data in the read data fed via the amplifier circuit 3. At this time, the PLL circuit in the data discrimination circuit 4 is in its locked state. The data discrimination circuit 4 outputs the detected data to the external device (not shown). Since the PLL circuit in the data discrimination circuit 4 is in its locked state, the data-rate deciding portion 13 maintains the "1" state of its output signal to the switch 54. As a result, the 360-rpm voltage continues to be applied to the subtracter 9, and the shaft of the spindle motor 1 and the magnetic disk D remain rotated at 360 rpm. In addition, the magnetic head 2 continues to read the data from the magnetic disk D, and the data discrimination circuit 4 remains successfully detecting actual data in the read data fed via the amplifier circuit 3.

When the motor stop signal changes from "0" to "1", the 0-rpm voltage produced by the signal generator 53 is applied to the subtracter 9 via the switch 55 regardless of the state of the output signal from the data-rate deciding portion 13. As a result, the shaft of the spindle motor 1 and the magnetic disk D are stopped.

What is claimed is:

1. A magnetic disk apparatus comprising:

a spindle motor for rotating a magnetic disk;

first means for selectively generating either a first pulse-train signal or a second pulse-train signal, the first pulse-train signal being a continuous pulse-train signal, the second pulse-train signal being equivalent in waveform to but having at least one pulse removed from the first pulse-train signal; and second means for, when the first means generates the first pulse-train signal, controlling the spindle motor to rotate at a first rotational speed in response to the first pulse-train signal, and for, when the first means generates the second pulse-train signal, controlling the spindle motor to rotate at a second rotational speed in response to the second pulse-train signal, the second rotational speed differing from the first rotational speed.

2. A magnetic disk apparatus as recited in claim 1, further comprising:

third means for reading a signal from the magnetic disk;

fourth means for discriminating data from the signal read by the third means;

fifth means for determining whether or not the fourth means normally discriminates the data from the signal read by the third means; and sixth means for, in cases where the fifth means determines that the fourth means normally discriminates the data, controlling the first means to unchange one of the first and second pulse-train signals which is currently generated by the first means, and for, in cases where the fifth means determines that the fourth means does not normally discriminate the data, controlling the first means to change one of the first and second pulse-train signals which is currently generated by the first means to the other of the first and second pulse-train signals.

3. A magnetic disk apparatus as recited in claim 1, wherein the first means comprises means for generating a fixed-level signal in response to a motor stop signal, and the second means comprises means for, when the first means generates the fixed-level signal, stopping the spindle motor in response to the fixed-level signal.

* * * * *